United States Patent
Ryu

(10) Patent No.: US 9,454,369 B2
(45) Date of Patent: Sep. 27, 2016

(54) DEVICE AND METHOD FOR PROCESSING MESSAGE

(71) Applicant: LSIS CO., LTD., Anyang-si, Gyeonggi-do (KR)

(72) Inventor: Hwa Soo Ryu, Nonsan-si (KR)

(73) Assignee: LSIS CO., LTD., Anyang-si (KR)

( * ) Notice: Subject to any disclaimer, the term of this patent is extended or adjusted under 35 U.S.C. 154(b) by 25 days.

(21) Appl. No.: 14/494,323

(22) Filed: Sep. 23, 2014

(65) Prior Publication Data
US 2015/0121015 A1    Apr. 30, 2015

(30) Foreign Application Priority Data
Oct. 29, 2013   (KR) .................. 10-2013-0129254

(51) Int. Cl.
| | | |
|---|---|---|
| G06F 12/00 | (2006.01) | |
| G06F 13/00 | (2006.01) | |
| G06F 9/30  | (2006.01) | |
| G06F 3/06  | (2006.01) | |
| G06F 9/38  | (2006.01) | |
| G06F 13/18 | (2006.01) | |
| G06F 9/54  | (2006.01) | |

(52) U.S. Cl.
CPC ........... *G06F 9/3004* (2013.01); *G06F 3/0604* (2013.01); *G06F 3/0655* (2013.01); *G06F 3/0671* (2013.01); *G06F 9/3885* (2013.01); *G06F 9/544* (2013.01); *G06F 13/18* (2013.01)

(58) Field of Classification Search
None
See application file for complete search history.

(56) References Cited

U.S. PATENT DOCUMENTS

| | | | |
|---|---|---|---|
| 2005/0120151 A1 | 6/2005 | Furukawa et al. | |
| 2006/0242257 A1* | 10/2006 | Kuribayashi | G06F 15/16 709/214 |

FOREIGN PATENT DOCUMENTS

| | | |
|---|---|---|
| JP | 04-270535 | 9/1992 |
| JP | 2011-170476 | 9/2011 |

OTHER PUBLICATIONS

European Patent Office Application Serial No. 14188274.6, Search Report dated Feb. 2, 2015, 8 pages.
Japan Patent Office Application Serial No. 2014-209009, Office Action dated Sep. 15, 2015, 5 pages.

* cited by examiner

*Primary Examiner* — Sean D Rossiter
(74) *Attorney, Agent, or Firm* — Lee, Hong, Degerman, Kang & Waimey; Jonathan Kang; Harry Lee

(57) ABSTRACT

Embodiments provide a device and method for processing messages according to a priority order and for reducing a message processing time when a response event occurs, in a PLC communication module.

6 Claims, 4 Drawing Sheets

(a) | MESSAGE TYPE | MESSAGE PRIORITY ORDER | RESPONSE MESSAGE PROCESSING FUNCTION ADDRESS |

(b) | MESSAGE TYPE | MESSAGE PRIORITY ORDER | RESPONSE MESSAGE PROCESSING FUNCTION ADDRESS |

DEVICE AND METHOD FOR PROCESSING MESSAGE

CROSS-REFERENCE TO RELATED APPLICATIONS

Pursuant to 35 U.S.C. §119(a), this application claims the benefit of earlier filing date and right of priority Korean Patent Application No. 10-2013-0129254, filed on Oct. 29, 2013, the contents of which are hereby incorporated by reference herein in its entirety.

BACKGROUND

The present disclosure relates to a device and method for processing messages, and more particularly, to a device and method for processing messages used in a PLC communication module.

A programmable logic controller (PLC) which is one of the main devices for factory automation requires modules having various functions to be used for various purposes. In particular, a communication module for transmitting/receiving data to/from a central processing unit (CPU) of the PLC has become more important.

Recently, a communication module in which two processes are used to process a large amount of data has become more widely used.

When two processors exchange messages in a conventional PLC communication module, response messages are generated in order of making communication requests, and functions to be processed are designated according to message types.

However, according to the conventional method, since the response messages are generated in order of making communication requests, a message having a high priority may not be processed first.

Furthermore, since the functions to be processed are designated for each message type when the response messages are processed, a processing time may be unnecessarily increased if the number of the message types is increased.

SUMMARY

Embodiments provide a device and method for processing messages according to a priority order and for reducing a message processing time when a response event occurs, in a PLC communication module.

In one embodiment, a method for processing messages of a first processor and a second processor in a communication module of a programmable logic controller (PLC) including the first processor, the second processor and a shared memory including a first sector for storing high-priority messages and a second sector for storing low-priority messages includes determining, by the first processor, a priority order to be processed by the second processor and writing a request message in the first sector or the second sector of the shared memory according to the priority order, processing, by the second processor, communication for the request message of the first sector with precedence over the second sector, checking, by the second processor, the priority order of the request message and writing a response message in the first sector or the second sector of the shared memory according to the priority order, and reading, by the first processor, the response message of the first sector with precedence over the second sector and moving to a corresponding message function address.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
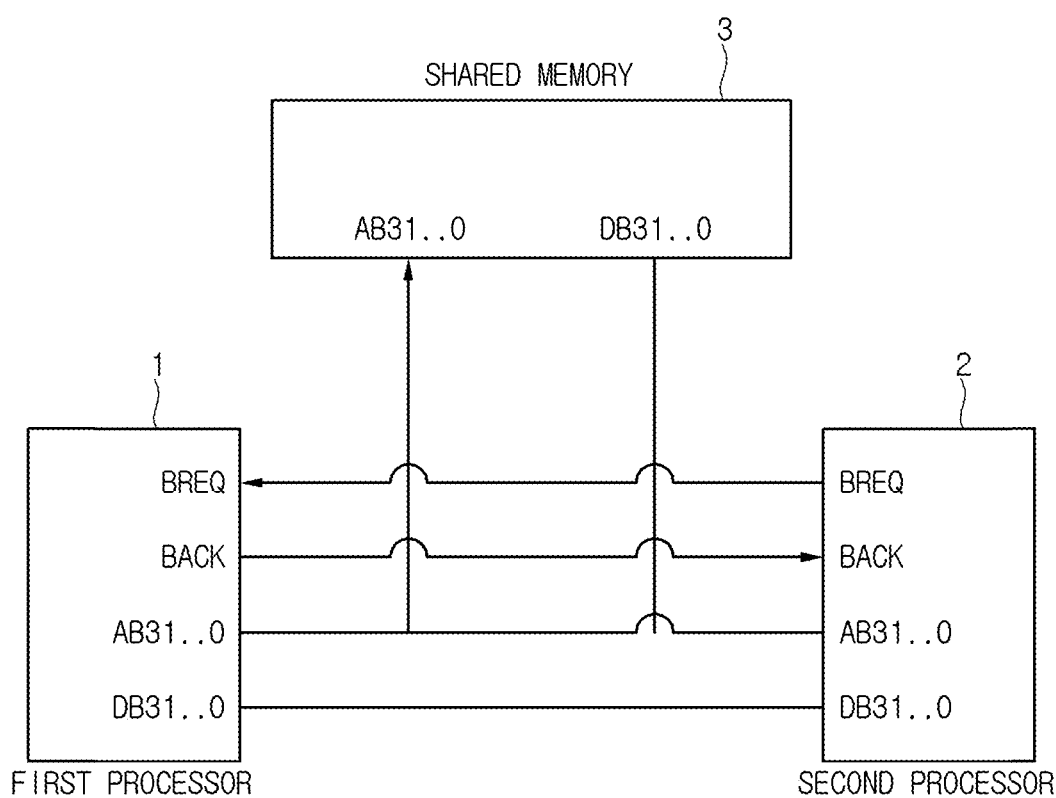
FIG. 1 is a diagram exemplarily illustrating a communication module using two processors according to an embodiment.

FIG. 1 is a diagram exemplarily illustrating a communication module using two processors according to an embodiment.

As shown, a first processor 1 and a second processor 2 are connected to a shared memory 3 in a PLC communication module. The shared memory 3 is used for the first processor 1 and the second processor 2 to exchange messages.

The first processor 1 may request communication from the second processor 2 via the shared memory 3. Here, the share memory 3 may be connected to an address bus AB31..0 and a data bus DB31..0, wherein the address bus and the data bus are unable to be simultaneously shared by the first and second processors 1 and 2. The address bus is connected to the first processor 1, the second processor 2 and the shared memory 3, and the data bus is also connected to the first processor 1, the second processor 2 and the shared memory 3.

'BREQ' is a bus request signal used for the second processor 2 to request a bus control right from the first processor 1. Only one processor having the bus control right may access the bus.

'BACK' is a bus acknowledgement signal used for the first processor 1 to hand over the bus control right to the second processor 2.

The second processor 2 may set the bus request signal BREQ at a low level to request the bus control right from the first processor 1 in order to access the shared memory 3. The first processor 1 recognizes that the bus request signal BREQ is at a low level, and sets the bus acknowledgement signal BACK at a low level to hand over the bus control right to the second processor 2. The second processor 2 may recognize that the bus acknowledgement signal BAK is at a low level, and may access the shared memory 3.

Figure 2:
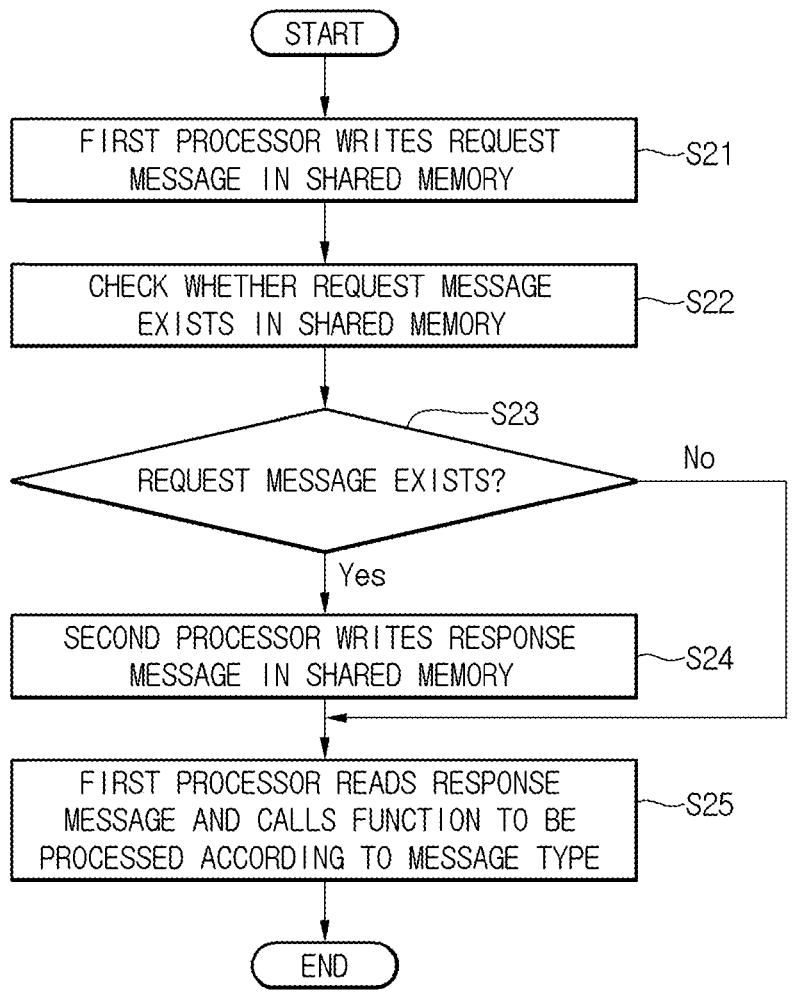
FIG. 2 is a flowchart illustrating a conventional message processing method.

FIG. 2 is a flowchart illustrating a conventional message processing method.

The first processor 1 writes a request message in the shared memory 3 in order to request communication from the second processor 2 (operation S21).

The second processor 2 checks whether there is the request message in the shared memory 3 (operation S22). If the request message exists (operation S23), the second processor 2 processes communication and writes a response message in the shared memory 3 (operation S24).

The first processor 1 reads the response message from the shared memory 3, and processes the response message. Here, a function to be processed may be called according to a message type of the response message (operation S25).

Figure 3:
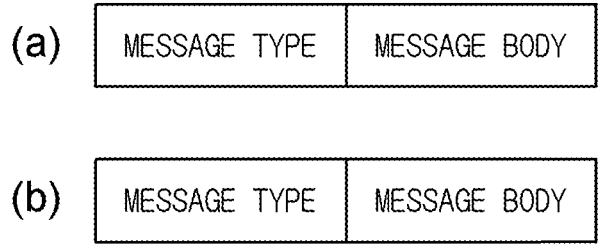
FIG. 3 is a diagram exemplarily illustrating a message type used for the method of FIG. 2.

FIG. 3 is a diagram exemplarily illustrating the message type used for the method of FIG. 2, wherein (a) of FIG. 3 represents a request message format and (b) of FIG. 3 represents a response message format.

As shown, both the request message and the response message include a message type field and a message body field. The first processor 1 calls a function to be processed according to the message type of the response message.

However, as described above, according to the conventional method, response messages are generated in order of making communication requests, and thus, a message having a high priority may not be processed first. Furthermore, since the functions to be processed are designated for each message type when the response messages are processed, a processing time may be unnecessarily increased if the number of the message types is increased.

The embodiments of the present disclosure are directed to overcoming the above-mentioned limitations. According to the embodiments, messages are processed according to a priority order, and a message processing time may be reduced when a response event occurs.

A message processing method according to the embodiments of the present disclosure will now be described.

Figure 4:
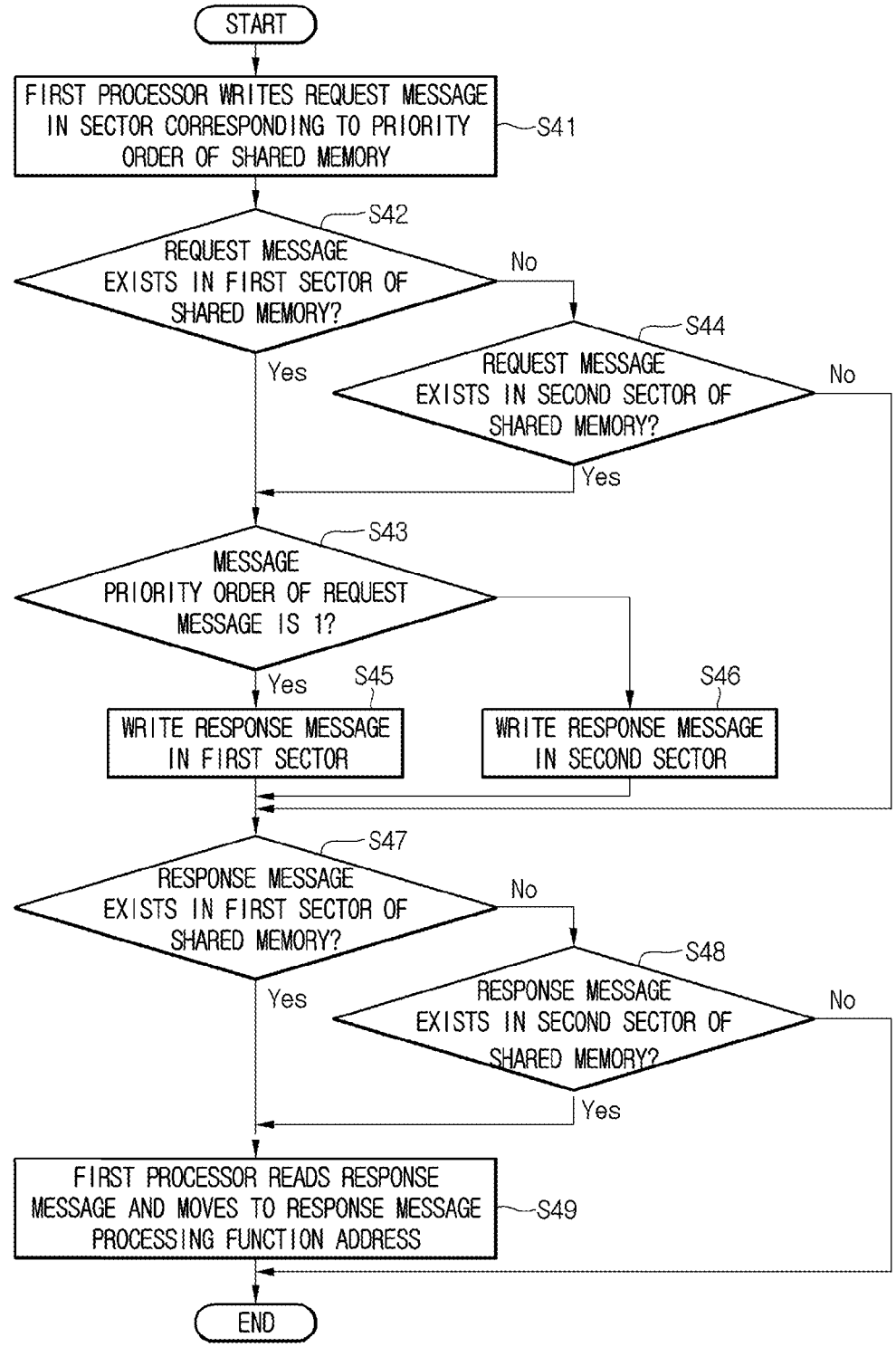
FIG. 4 is a flowchart illustrating a message processing method according to an embodiment.

FIG. 4 is a flowchart illustrating a message processing method according to an embodiment, the method being applied to the PLC communication module of FIG. 1.

As shown, according to the message processing method, the first processor 1 writes a request message in the shared memory 3 in order to request communication from the second processor 2 (operation S41). Here, the first processor 1 may write a priority order in the request message, and may write the request message in a corresponding sector of the shared memory 3 according to the priority order.

Figures 5, 6:
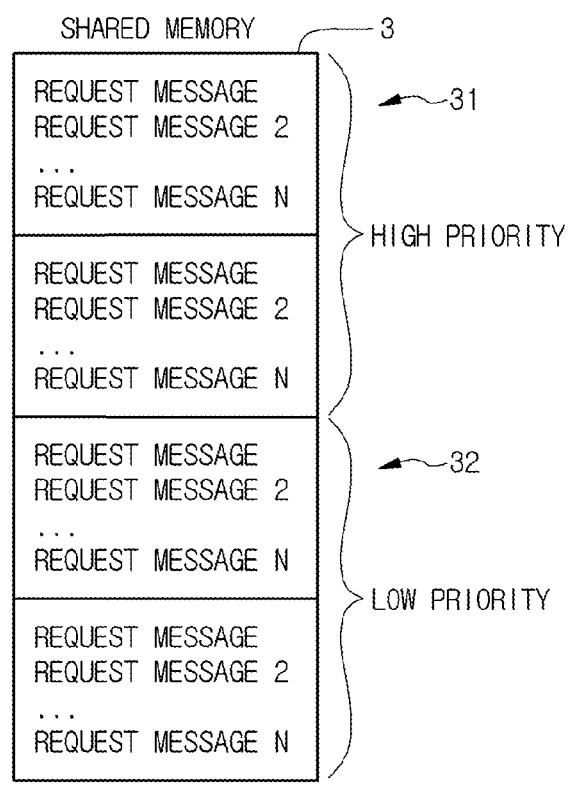
FIG. 5 is a diagram exemplarily illustrating formats of a request message and a response message written in a shared memory according to an embodiment.
FIG. 6 is a diagram illustrating a shared memory according to an embodiment.

FIG. 5 is a diagram exemplarily illustrating formats of the request message and response message written in the shared memory, according to an embodiment, and FIG. 6 is a diagram illustrating the shared memory according to an embodiment.

(a) of FIG. 5 represents a request message format and (b) of FIG. 5 represents a response message format. As shown, both the request message written by the first processor 1 and the response message written by the second processor 2 may include a message type field, a message priority order field, and a response message processing function address field. For example, when the message priority order field has a value of 1, a high priority order may be assigned to processing of a request or a response, or, when the message priority order field has a value of 0, a low priority order may be assigned to the processing of the request or the response.

As illustrated in FIG. 6, the shared memory 3 includes a first sector 31 for storing a high-priority request message and a high-priority response message and a second sector 32 for storing a low-priority request message and a low-priority response message.

Furthermore, in the first sector 31 of the shared memory 3, a request message and a response message may be stored in separate blocks respectively, and, in the second sector 32, a request message and a response message may be stored in separate blocks respectively. This method is different from that of FIG. 2 in which request messages and response messages are stored in order of generation of the messages. That is, according to the method of FIG. 2, the shared memory 3 stores request message and response messages in order of, for example, 'request message 1, response message 1, request message 2, response message 2, . . . , request message N, response message N', but, according to the embodiments of present disclosure, sectors are differentiated according to a priority order, and a block for request messages and a block for response messages are separate from each other within a sector.

In other words, in operation S41, in the case where a message should be preferentially processed by the second processor 2, the first processor 1 may set the message priority order field of a request message as 1, and may write the request message in a request message block of the first sector 31.

In the case where a request message exists in the first sector 31 of the shared memory 3 (operation S42), the second processor 2 processes communication according to the request message, or, in the case where the request message does not exist in the first sector 31 of the shared memory 3 (operation S42), the second processor 2 checks whether a request message exists in the second sector 32 of the shared memory 3 so as to process communication (operation S44). That is, the second processor 2 may preferentially process communication for the request message of the first sector 31 before processing communication for the request message of the second sector 32 of the shared memory 3.

Thereafter, in the case where the message priority order field of the request message has a value of 1 (operation S43), the second processor 2 writes a response message in the first sector 31 of the shared memory 3 (operation S45), or, in the case where the message priority order field of the request message does not have a value of 1 (but has a value of 0) (operation S43), the second processor 2 may write a response message in the second sector 32 (operation S46).

In the case where the response message exists in the first sector 31 of the shared memory 3 (operation S47), the first processor 1 may read the response message and may move to a function address indicated by the response message processing function address field (operation S49).

On the contrary, in the case where the response message does not exist in the first sector 31 of the shared memory 3 (operation S47), the first processor 1 may check whether the response message exists in the second sector 32 (operation S48), and may read the response message and may move to the function address indicated by the response message processing function address field (operation S49).

That is, the first processor 1 may preferentially process the response message of the first sector 31 before processing the response message of the second sector 32, so as to move to the function address indicated by the response message processing function address field.

As described above, according to the embodiments of the present disclosure, when two processors of a PLC communication module exchange messages, the messages are classified according to a priority order so that a message having a high priority is processed first.

Furthermore, according to the embodiments of the present disclosure, an address of a function to be performed is added to a request message to transmit the request message, so that a message processing time may be minimized when a response event occurs.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for processing messages of a first processor and a second processor in a communication module of a programmable logic controller (PLC) comprising the first processor, the second processor and a shared memory comprising a first sector for storing high-priority messages and a second sector for storing low-priority messages, the method comprising:
   determining, by the first processor, a priority order to be processed by the second processor and writing a request message in the first sector or the second sector of the shared memory according to the priority order;
   processing, by the second processor, communication for the request message of the first sector with precedence over the second sector;
   checking, by the second processor, the priority order of the request message and writing a response message in the first sector or the second sector of the shared memory according to the priority order;
   moving, by the first processor, when the response message exists in the first sector of the shared memory, the response message in the first sector to a function address defined in the response message processing function field of the response message written in the first sector;
   checking, by the first processor, when the response message does not exist in the first sector of the shared memory, whether the response message exists in the second sector of the shared memory; and
   moving by the first processor, the response message in the second sector to the function address defined in the response message processing function field of the response message written in the second sector,
   wherein the message function address is an address of a function processed according to a message type, and
   wherein each of the request message and the response message comprises a message type field, a message priority order field, and a response message processing function address field.

2. The method according to claim 1, wherein processing the communication comprises:
   processing, when the request message exists in the first sector, the communication for the request message;
   checking, when the request message does not exist in the first sector, whether the request message exists in the second sector of the shared memory; and
   processing the communication for the request message of the second sector.

3. The method according to claim 1, wherein checking the priority order comprises checking the message priority order field of the request message and further comprising;
   writing the response message in the first sector when the priority order field has a high priority value; and
   writing the response message in the second sector when the priority order field has a low priority value.

4. A device for processing messages in a communication module of a programmable logic controller (PLC) comprising a first processor, a second processor and a shared memory comprising a first sector for storing high-priority messages and a second sector for storing low-priority messages, wherein:
   the first processor determines a priority order to be processed by the second processor and writes a request message in the first sector or the second sector of the shared memory according to the priority order;
   the second processor processes communication for the request message of the first sector with precedence over the second sector;
   the second processor checks the priority order of the request message and writes a response message in the first sector or the second sector of the shared memory according to the priority order;
   the first processor moves, when the response message exists in the first sector of the shared memory, the response message in the first sector to a function address defined in the response message processing function field of the response message written in the first sector;
   the first processor checks, when the response message does not exist in the first sector of the shared memory, whether the response message exists in the second sector of the shared memory; and
   the first processor moves the response message in the second sector to the function address defined in the response message processing function field of the response message written in the second sector,
   wherein the message function address is an address of a function processed according to a message type, and
   wherein each of the request message and the response message comprises a message type field, a message priority order field, and a response message processing function address field.

5. The device according to claim 4, wherein the second processor processes, when the request message exists in the first sector, the communication for the request message, checks, when the request message does not exist in the first sector, whether the request message exists in the second sector of the shared memory, and processes the communication for the request message of the second sector.

6. The device according to claim 4, wherein the second processor checks the message priority order field of the request message, writes the response message in the first sector when the priority order field has a high priority value, and writes the response message in the second sector when the priority order field has a low priority value.

* * * * *